United States Patent
Tang et al.

(10) Patent No.: US 9,426,520 B2
(45) Date of Patent: Aug. 23, 2016

(54) MULTIMEDIA CONTENT SELF-ADAPTIVE METHOD AND MULTIMEDIA PLAYING SYSTEM

(71) Applicants: Ruichun Tang, Qingdao (CN); Chao Liu, Qingdao (CN); Yili Zhai, Qingdao (CN)

(72) Inventors: Ruichun Tang, Qingdao (CN); Chao Liu, Qingdao (CN); Yili Zhai, Qingdao (CN)

(73) Assignee: HAIER GROUP CO., Qingdao (CN)

( * ) Notice: Subject to any disclaimer, the term of this patent is extended or adjusted under 35 U.S.C. 154(b) by 0 days.

(21) Appl. No.: 14/444,264

(22) Filed: Jul. 28, 2014

(65) Prior Publication Data
US 2015/0143434 A1  May 21, 2015

(30) Foreign Application Priority Data
Nov. 21, 2013  (CN) .......................... 2013 1 0597884

(51) Int. Cl.
| | | |
|---|---|---|
| *H04N 21/436* | (2011.01) | |
| *H04N 21/2381* | (2011.01) | |
| *H04N 21/438* | (2011.01) | |
| *H04N 21/2662* | (2011.01) | |
| *H04N 21/854* | (2011.01) | |
| *H04N 21/214* | (2011.01) | |

(52) U.S. Cl.
CPC .... *H04N 21/43615* (2013.01); *H04N 21/2381* (2013.01); *H04N 21/2662* (2013.01); *H04N 21/4381* (2013.01); *H04N 21/85403* (2013.01); *H04N 21/214* (2013.01)

(58) Field of Classification Search
USPC .................................................. 725/80, 107
See application file for complete search history.

(56) References Cited

U.S. PATENT DOCUMENTS

| 2004/0045030 A1* | 3/2004 | Reynolds | ................ | H04L 29/06 |
| | | | | 725/110 |
| 2012/0011556 A1* | 1/2012 | Kang | .................... | H04N 7/165 |
| | | | | 725/113 |

* cited by examiner

*Primary Examiner* — Pankaj Kumar
*Assistant Examiner* — Charles N Hicks
(74) *Attorney, Agent, or Firm* — Troutman Sanders LLP

(57) ABSTRACT

The present technology relates to a multimedia content self-adaptive method and a multimedia playing system, wherein the multimedia content self-adaptive method includes: obtaining context information; solving the media content adaptation problem according to the obtained context information. Applying the multimedia content self-adaptive method and multimedia playing system provided by the present technology, the content adaptation for the AV playing environment can be realized under the UPnP AV standard, thereby providing intelligent multimedia services.

3 Claims, 1 Drawing Sheet

MULTIMEDIA CONTENT SELF-ADAPTIVE METHOD AND MULTIMEDIA PLAYING SYSTEM

CROSS-REFERENCE

This application claims priority to Chinese Patent Application No. 201310597884.9, filed on Nov. 21, 2013, entitled "Multimedia Content Self-Adaptive Method and Multimedia Playing System," which is herein incorporated by reference in its entirety.

FIELD OF THE INVENTION

The present technology relates to a multimedia playing technology, specially, to a multimedia content self-adaptive method and a multimedia playing system.

BACKGROUND OF THE INVENTION

Along with rapid increase of the multimedia content, appearance of various different terminal devices and dynamic characteristics of heterogeneous networks, the demand of users for multimedia experience becomes increasingly higher. They hope to use various devices to enjoy better multimedia services anytime and anywhere, and this paradigm is referred to as UMA (Universal Multimedia Access).

The content adaptation is aiming to arrive at the above target, and the media content is adjusted according to the applying environment of the multimedia content (the corresponding context information) to make the original content conform to the user's demand. However, the home multimedia system standard (e.g. UPnP AV, etc.) only provides basic building modules of the multimedia system, but does not provide corresponding content adaptation functions, thus, in order to ensure better multimedia experience, it is required to adjust the AV content according to the context information.

SUMMARY OF THE INVENTION

A brief description with respect to the present technology is given below to provide basic understanding of some aspects with respect to the present technology. It should be understood that, this description is not exhaustive type overview. It is not intended to define the key or important part of the present technology, and it is also not intended to limit the scope of the present technology. The purpose is only to provide some concepts in a simplified form as the preamble of the later discussed description in more detail.

One primary objective of the present technology is to provide a multimedia content self-adaptive method and a multimedia playing system which are capable of realizing content adaptation to the AV playing environment under the UPnPAV standard, thereby providing intelligent multimedia services.

According to a first aspect of the present technology, the multimedia content self-adaptive method includes:
  obtaining context information;
  solving the media content adaptation problem according to the obtained context information.

According to a second aspect of the present technology, the multimedia playing system includes a media server, a media player and an AV control note, wherein,
  the media server is used for providing media content and completing the browsing and/or query operations;
  the media player is used for carrying out playing control, connection management and/or AV transmission service for the media contents;
  the AV control note is used for controlling the operations of the media server and the media player.

By applying the multimedia content self-adaptive method and the multimedia playing system of the present technology, content adaptation to the AV playing environment under the UPnP AV standard can be realized, thereby providing intelligent multimedia services.

BRIEF DESCRIPTION OF THE DRAWINGS

Referring to the following description of the embodiments provided by the present invention in conjunction with the appended drawings, it would be understood the above and other objectives, characteristics and advantages of the present technology more easily. The components depicted in the drawings only aim to illustrate the principle of the present technology. In the appended drawings, the same or similar feature or component would be expressed using a same or similar appended drawing reference.

DETAILED DESCRIPTION OF EMBODIMENTS

In the following, the embodiments of the present technology are described by referring to the appended drawings. Elements and characteristics described in one drawing or embodiment in the present technology may be combined with one or more elements and characteristics showed in other drawings or embodiments. It should be noted that, for the purpose of clarity, the appended drawings and the description omit the representations and descriptions of the components and process that have nothing to do with the present technology and known by one ordinary person skilled in the art.

Figure 1:
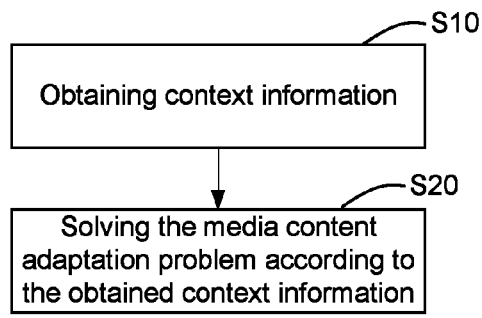
FIG. 1 is the flow chart of one embodiment of the multimedia content self-adaptive method provided by the present technology.

Referring to FIG. 1, provided is a flow chart of one embodiment of the multimedia content self-adaptive method provided by the present technology.

In the present embodiment, the multimedia content self-adaptive method may include:
  S10: obtaining context information;
  S20: solving the media content adaptation problem according to the obtained context information.

As one embodiment, the context information may be obtained through a context module established based on the MPEG-21 DIA standard.

MPEG-21 DIA (Digital Item Adaptation) is a widely used multimedia standard for describing context, and it provides a rich group of tool sets for handling media adaptation by defining the Usage Environment Descriptions (UED). In order to ensure the inter-operability with other systems, MPEG-21 DIA tools are applied to obtain the context information.

There may exist five types of context modules, including: terminal capability, network feature, user feature, natural environment information and common restriction description.

The terminal capability may be the context information for describing the capability of consuming and processing the media content for certain terminal device. It may include the coding and decoding capability, the device features (e.g., the power supply and storage) and the input and output capability (e.g., the display feature and the audio output capability) of the terminal device.

The network feature may include the terminal's network capacity and state, wherein the network capacity may define the static attributes of the network including the maximum capacity of the network and the maximum bandwidth of the network, etc.; the network state may describe the dynamic features of the network, such as the available bandwidth, the error rate and the time delay, etc.

The user feature may include the information such as user preference, user interaction, etc. The user preference may be the user's preferences for different type of media content and the browsing mode (the dependence on the time and place), and the user interaction may be the user's preference for the content consumption.

The natural environment information may include the information such as the user's position, the time, the audio and video environment, etc. The audio and video environment may describe the information that may possibly affect the content transmission way and the user's consumption pattern, such as the voice and the lighting features.

The common restriction description may allow the user to customize the optimization constrains of the content adaptation, thus the user may transmit additional rules to the corresponding processing module for generating more satisfactory adaptation content.

The multimedia content self-adaptive method may be implemented according to the context information, especially considering the content processing demands of unique feature of the user's device (e.g., the coder and decoder type, the display resolution supported by the device, etc.). The adapted content may not only match to the playing and display capability of the target device, but may also meet the requirements of the current network feature, the user preference and the natural environment information.

As one embodiment, the step of implementing the media content adaptation according to the obtained context information in the step S20 may concretely include:

S21: transforming the expression of the media content adaptation problem to the expression of the constraint satisfaction problem, and solving the expression of the constraint satisfaction problem.

The media content adaptation problem Q may be described using a quadruple:

$$Q=\{X',D',G,C'\} \quad (1)$$

wherein X' may be an adjustable option set:

$$X'=\{x'_1,x'_2,\ldots,x'_n\} \quad (2)$$

Figure 2:
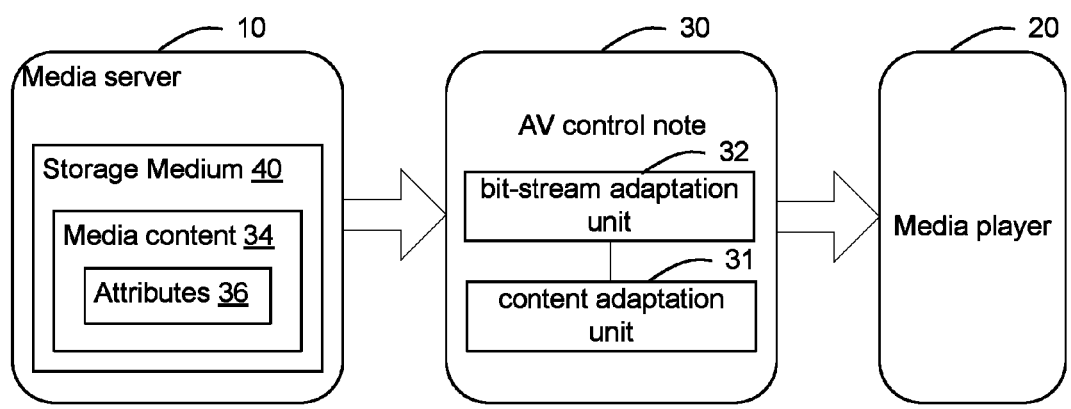
FIG. 2 is the constructional drawing of one embodiment of the multimedia playing system provided by the present technology.

$x'_i$ may represent a variable attribute 36 of the media content 34 as see in FIG. 2, such as the format, resolution, etc. $i\in[1,\ldots,n]$; $D'=\{D'_1, D'_2, \ldots, D'_n\}$ may be an alternative set of the adjustable option set X', and $D'_i$ may be the value range of $x'_i$, i.e. $x'_i \in D'_i$, $i\in[1,\ldots,n]$; G may be the requirement for the media content adaptation of the user feature and the natural environment information; C' may be the requirement for the media content adaptation of the terminal capability and the network feature.

The constraint satisfaction problem may be expressed by a triple P=\{X,D,C\}, wherein X=\{$x_1, x_2, \ldots, x_n$\} may be a set constituted by finite number of variables. D=\{$D_1$, $D_2, \ldots, D_n$\} may be a set constituted by finite ranges of variables $x_i$ (1≤i≤n) and $x_i \in D_i$.

C may represent the set of value constraints for the variable X, and it may be a subset of Cartesian product of the value ranges of the variables included in P; its solution may assign a value of its range to each variable to make it satisfy all constraints simultaneously.

The media content adaptation problem may be described using the constraint satisfaction problem, this is because there may be one-to-one corresponding relations between each element of the media content adaptation problem and each element of the constraint satisfaction problem.

1) The adjustable option set X' may be transformed to the variable set X of the constraint satisfaction problem.

2) The selection domain D' of the adjustable options may be transformed to the domain D of the constraint satisfaction problem.

3) C' and G may be equated to implementing certain combined constraints between the adjustable options $x_1$, $x_2, \ldots x_n$, i.e. to regulate to implement certain combination between the adjustable options, thus C' and G may be transformed to the constraints C of the constraint satisfaction problem.

4) The solution of Q may be transformed to the solution of the constraint satisfaction problem P \{X,D,C\}.

Therefore, the media content adaptation problem may be transformed to the constraint satisfaction problem.

The media content adaptation problem based on the constraint satisfaction in formula (1) may be constituted by three components, and they respectively may be adjustable option set X', the alternative set D' of X', and the content adaptation constraints G and C'.

(1) Content Adaptation Constraints G and C'

It may be known from the analysis above, the constraints G and the constraints C' may be attributed to the constraints C of the constraint satisfaction problem. C' may be directly expressed as the constraints C of the constraint satisfaction problem, and may be expressed and solved in the media content adaptation problem which may be based on the constraint satisfaction.

The constraints G may not be simply expressed as the constraints C of the constraint satisfaction problem, because the family user's features and the natural environment information may be various, and further the transcoding capability of the content adaptation engine may be restricted, when using it as a necessarily satisfied adaptation constraint to participate in the content adaptation decision, it would occur the case that none of the context information of the user would be satisfied, and the adaptation decision problem would have no solution as a result. Therefore, it may be necessary to classify the requirement of the AV playing environment to enable the constraint satisfaction problem to satisfy the content adaptation features, thereby obtaining the solution of the adaptation decision problem.

According to the content adaptation features, the constraints may be classified into two classes: the compulsory constraints ($C_F$) and the proposed constraints ($C_A$).

The compulsory constraints may request that the adaptation decision result must satisfy the constraint relation, if all the adaptation decision results can not satisfy the constraint relation, the constraint satisfaction problem has no solution.

The proposed constraints may request that the adaptation decision results satisfy the constraint relation as closely as possible, if none of the adaptation decision result satisfies the constraint relation, its solution may be the adaptation decision result which may be the closest one to the requirement of the constraint relation.

In conclusion, the media content adaptation problem $Q=\{X',D',G,C'\}$ may be transformed to the following problem $R=\{X,D,C_A,C_F\}$.

In formula (2), $x'_i$, as a variable of the adjustable options, normally may have multiple values, such as, in the media content adaptation problem, the video format $x'_i$ may be selected from {FLY, 3GP, MP4, AVI, WMV . . . }.

$x'_i$ may be the objective or subjective attributes of the media document, thus the value of $x'_i$ may be discrete, and further the value range may be restricted by the type of the media document, thus the value range may be discrete, and $x'_i$ may not be assigned a value arbitrarily.

Whether the compulsory constraints and the proposed constraints can be precisely expressed by a logic relation or not may directly affect the efficiency and accuracy of solving the media content adaptation problem which is transformed to the constraint satisfactory problem. Thus, it may be necessary to use a normalized method to describe the content adaptation problem.

The expression of the constraint satisfaction problem may include proposed constraints and compulsory constraints.

The compulsory constrains may include one-dimension compulsory constraints, and two-dimension and more than two-dimension compulsory constraints.

One-dimension constraint may be expressed as:

$$(C_i, x_i) \rightarrow \text{val}(x_i) \in D'_i \quad (3)$$

Wherein $C_i$ may be one element in the constraint set C, $\text{val}(x_i)$ may be the element after executing processing on $x_i$, $D'_i$ may be the value range of the variable $x_i$ which may satisfy the constraint $C_i$, and $D'_i$ may be a subset of $D_i$.

As to the media content adaptation problem, most of the constraints constituted by the terminal capability requirements may be one-dimension constraints. This type of constraint may only work on a certain individual adjustable option $x_i$, and the result may be removing the instance that does not satisfy the constraint condition from the value range $D_i$ corresponding to the adjustable option $x_i$, and $x_i$ may only take a value of the available instance set $D'_i$. For example, a mobile phone's requirement for the video format may be 3GP.

Different from one-dimension constraints, two-dimension and more than two dimension constraints may mainly express the constraint relations between the adjustable options. Normally, the two-dimension and more than two dimension constraint may be expressed as follows:

$$(C_i, x_i) \rightarrow \text{val}(x_j) \in D'_j, \ldots, \text{val}(x_m) \in D'_m \quad (4)$$

If the constraint $C_i$ works on the adjustable option $x_i$ to enable it to take a value in $D'_i$, the adjustable options $x_j, \ldots, x_m$ may only take values in a certain available instance set $D'_j, \ldots, D'_m$ thus not only the dependency relation between the instances of the value range of each adjustable option may be expressed, but also the exclusion relation between them may be expressed. For example, if the image is required to be dynamic, the image format may be required to be GIF.

As one embodiment, the step of solving the expression of the constraint satisfaction problem may include:

S211: implementing one-dimension constraint filtrating calculation on all the adjustable options of the media document and the one-dimension compulsory constraints to obtain an optional set of the available adjustable options, which may concretely include: firstly, determining the one-dimension compulsory constraint set $\{C_1, C_2, \ldots, C_i, \ldots\}$ at may work in the content adaptation process and the adjustable options $\{x_1, x_2, \ldots, x_i, \ldots\}$ thereof, then according to the requirement of the constraint $C_i$ filtrating the optional adjustable options in the value range $D_i$ of $x_i$ and removing the optional adjustable options which may not satisfy the constraint condition to obtain the set of the adjustable option $x_i$ which satisfies the constraint $C_i$. Repeating the operations above until the value ranges $\{D'_1, D'_2, \ldots, D'_n\}$ of the adjustable options $\{x_1, x_2, \ldots, x_n\}$ which may satisfy all the one-dimension compulsory constraints are obtained.

S212: solving the optional set of the adjustable options, the two-dimension and more than two dimension compulsory constraints and proposed constraints to obtain all the adjustable options which may satisfy the compulsory constraints and the proposed constraint satisfaction degrees thereof.

S213: selecting the adjustable options with the highest proposed constraint satisfaction degree, that may be the media content adaptive to the current media playing environment.

The calculation formula of satisfaction degree R for the content adaptation decision on all the proposed constraints may be as follows:

$$R = \sum_{i=1}^{n} w_{C_A(i)} V_{C_A(i)} \quad (5)$$

Wherein n may be the number of the proposed constraints; $w_{C_A(i)}$ may be the relative weights of each proposed constraint, they may be obtained by the analytic hierarchy process and they satisfy $$\sum_{i=1}^{n} w_{C_A(i)} = 1;$$

$V_{C_A(i)}$ may be the satisfaction degree of the content adaptation decision for the proposed constraint $C_A(i)$.

On the basis that the data type of $C_A(i)$ may be different, the calculation methods may be described as follows.

1) quantitative type of attributes. There may be many quantitative type attributes in the proposed constraints at all levels, such as image resolution, contrast ratio and audio playing time, etc. The satisfaction degree for this type of constraint $V'_{C_A(i)}$ may be acquired by the formula (6):

$$V'_{C_A(i)} = 1 - \frac{|a-b|}{R(n)} \quad (6)$$

Wherein a and b may be the attribute values required by the constraint and achieved practically respectively; R(n) may be the general value range of the attribute values.

2) symbol type of attributes. In the proposed constraints at all levels, some symbol type of attributes also may be involved, such as image format, singer and movie theme, etc. The satisfaction degree for this type of constraint $V''_{C_A(i)}$ may be acquired by the formula (7):

$$V''_{C_A(i)} = \begin{cases} 1, & a = b \\ 0, & \text{others} \end{cases} \quad (7)$$

As another embodiment, the step of solving the optional set of the adjustable options and the two-dimension and more than two dimension compulsory constraints and proposed constraints may include:

1) making i=1 and selecting an instance $d_p(x_i)$ from the optional set $D'_i$ of the adjustable option $x_i$ that has not been assigned a value, after it is determined that $d_p(x_i)$ does not conflict with the compulsory constraints $C_F$, assigning $d_p(x_i)$ to $x_i$;

2) selecting an instance $d_q(x_{i+1})$ from the optional set $D'_{i+1}$ of the adjustable option $x_{i+1}$ that has not been assigned a value, judging whether $\{d_p(x_i),d_q(x_{i+1})\}$ conflicts with the compulsory constraints $C_F$;

3) if there is no conflict, then continuing the above operations on the adjustable options that have not been assigned values and returning to 2), otherwise, executing 4).

4) selecting another instance $d_k(x_{i+1})$ from $D'_{i+1}$, then judging again whether $\{d_p(x_i),d_k(x_{i+1})\}$ conflicts with the compulsory constraints $C_F$ or not, if all the available optional sets of $x_{i+1}$ and $d_p(x_i)$ do not satisfy the compulsory constraints $C_F$, starting to back trace to re-assigned values recursively to $x_i$, $x_{i+1}$, ... which have been assigned values, and returning to 2);

5) after all of the adjustable options are assigned values, i.e. an adaptation decision that satisfies the requirement may be obtained, calculating the satisfaction degree of the proposed constraints $C_A$ for each option of the media document.

When there is not an instance in the optional set $D'_i$ of $x_i$ combining with the assigned values of the other variables satisfies the compulsory constraints $C_F$, all the adjustable options that satisfy the compulsory constraints $C_F$ and the satisfaction degree for the proposed constraints $C_A$ thereof may be obtained. The transcoding operation may be executed according to the adjustable options with the highest satisfaction degree of the proposed constraints to obtain the media content that complies with the AV playing environment.

Referring to FIG. 2, provided is a constructional drawing of one embodiment of the multimedia playing system provided by the present technology.

In the embodiment, the multimedia playing system may include a media server 10, a media player 20 and an AV control note 30.

The media server 10 may be used for providing media content 34 and completing browsing and/or query operations. The media player 20 may be used for carrying out playing control, connection management and/or AV transmission service for the media contents. The AV control note 30 may be used for controlling the operations of the media server and the media player.

In one embodiment, the AV control note 30 may include a content adaptation unit 31 and a bit-stream adaptation unit 32. The content adaptation unit 31 may be used for implementing content adaptation adjustment according to the context information of the played AV if the format of the media content requested by the user does not comply with the playing environment, and transmitting the adjusted content to the user. The bit-stream adaptation unit 32 may be used for transcoding the adjusted content to obtain the target codes that comply with the AV playing environment.

For example, the content adaptation unit 31 may adaptively adjust the content according to the above multimedia content self-adaptive method.

In order to estimate the validity of the multimedia content self-adaptive method provided by the present technology, the image adaptation may be proposed as an example, a media playing platform under UPnP AV framework for real-time adapting the media content may be build. The media server and player may use Intel Tools for UPnP Technology as a tool; the adaptation engine may use open-source tool VLC and may integrate it with the AV control note to coordinate the playing process.

The adjustable options of the image may be shown in FIG. 1. SAMSUNG GT-S5570 as an example of the requirements of the user context information for the media content adaptation, which may be seen in table 2. The requirements C', G of the context information in table 2 may be transformed to the compulsory constraints $C_F$ and the proposed constraints $C_A$, which are shown in table 3.

TABLE 1

Adjustable Options of the Image

| Adjustable Option | Value Range |
|---|---|
| Format | RAW, BMP, GIF, JPEG, TGA, EXIF, SVG, PSD, DXF, EPS, PNG |
| Width | N |
| Height | N |
| Resolution | 320 × 240, 400 × 240, 640 × 480, 800 × 480, 800 × 600, 1024 × 600, 1024 × 768, 1280 × 720, 1280 × 768, 1280 × 800, 1152 × 864 |
| transmission rate | N KB/s |

Note:
N may be a natural number.

According to the media content adaptation algorithm, firstly, the one dimension constraint filtrating may be calculated, and the result may be obtained as shown in table 4 after the calculation. Applying the analytic hierarchy process, the weights of the proposed constraints 5 and 6 may be determined as 0.4 and 0.6 respectively, after that, the optional set of the adjustable options and the two-dimension and more than two dimension compulsory constraints and the proposed constraints may be solved and the obtained final decision result may be seen in Table 5.

TABLE 2

Requirements of User Context Information for Media Content Adaptation

| Requirements of User Context Information for Media Content Adaptation | Type |
|---|---|
| size of the main screen: 3.14 inch | C' |
| resolution of the main screen: 800 × 480 pixel | C' |
| supported image format: JPEG, PNG | C' |
| supported network type: GPRS, EDGE, HSDPA | C' |
| user's preference format: JPEG | G |
| User's acceptable cost: GPRS | G |

TABLE 3

Constraint Classification

| Constraint Name | Constraint Working scope and Dimension | Constraint Content | Constraint Type |
|---|---|---|---|
| constraint 1 | width, height/ 2 dimension | image size not larger than 3.14" | $C_F$ |
| constraint 2 | resolution/ 1 dimension | resolution not higher than 800 × 480 | $C_F$ |
| constraint 3 | format/ 1 dimension | formats are JPEG, PNG | $C_F$ |
| constraint 4 | network type/ 1 dimension | used transmission way: GPRS, EDGEor HSDPA | $C_F$ |
| constraint 5 | format/ 1 dimension | format is JPEG | $C_A$ |

TABLE 3-continued

Constraint Classification

| Constraint Name | Constraint Working scope and Dimension | Constraint Content | Constraint Type |
|---|---|---|---|
| constraint 6 | network type/ 1 dimension | using GPRS for transmission | $C_A$ |

TABLE 4

One-dimension Filtrating Calculation Result

| Adjustable Option | Value Range |
|---|---|
| format | JPEG PNG |
| width | not larger than 48.7 mm |
| height | not larger than 65.0 mm |
| resolution | 320 × 240, 400 × 240, 640 × 480, 800 × 480 |
| transmission rate | not higher than 53.6 kbps |

TABLE 5

Final Decision Result

| Decision Solution | Decision Composition | Constraint Satisfaction Degree | | Proposed Constraint Degree |
|---|---|---|---|---|
| | | $V_{C_A(5)}$ | $V_{C_A(6)}$ | $V_{C_A}$ |
| decision solution 1 | (png, 48, 64, 320 * 240, 36) | 0 | 0.56 | 0.34 |
| decision solution 2 | (png, 48, 64, 400 * 240, 37) | 0 | 0.58 | 0.35 |
| decision solution 3 | (jpeg, 48, 64, 320 * 240, 38) | 1 | 0.61 | 0.77 |
| decision solution 4 | (jpeg, 48, 64, 400 * 240, 39) | 1 | 0.63 | 0.78 |

It can be seen from Table 5, for the content adaptation problem, the decision solution 4 has the highest satisfaction degree for all the constraint conditions, so the bit-stream adaptation unit may implement transcoding on the media source codes according to the parameters of decision solution 4 to obtain the target codes that comply with the AV playing environment, thereby providing intelligent multimedia service for the user.

Applying the multimedia content self-adaptive method and the multimedia playing system provided by the present technology, the content adaptation for the AV playing environment may be realized under the UPnP AV standard, thereby providing intelligent multimedia service.

Some embodiments of the present technology are described in detail in the above. It should be understood by an ordinary person skilled in the art that, all or any step or component of the method and device provided by the present technology may be implemented by hardware, firmware, software or their combination in any computation device (including processor, storage media, e.g., storage medium 40 in FIG. 2, etc.) or in the network of the computation device, which may be realized, by an ordinary person skilled in the art, by using their basic programming skills on the condition of understanding the content of the present technology and therefore would not be illustrated in detail herein.

In the device and method embodiments provided by the present technology, it is obvious that the components and steps may be decomposed, combined and/or recombined after decomposition. These decompositions and/or recombinations may be viewed as the equivalent solutions of the present technology. It should be further noted that, the steps of the series of processing said in the above may be naturally executed in chronological order in accordance with the described sequence, but may not need to be executed in chronological order. Meanwhile, in the description of the specific embodiments of the present technology above, the features described and/or shown in one embodiment may be used in one or more other embodiments in a same or similar form, be combined with the features in the other embodiments, or be substitute for the features in the other embodiments.

It should be addressed that the terms "include/comprise", when using them, may refer to existence of the feature, element, step or component, but not exclusion of the existence or annexation of one or more other features, elements, steps or components.

It should be understood that, although the present technology and its advantages are described specifically, various changes, substitutes and transformations may be made without exceeding the spirit and scope of the present technology defined by the appending claims. Furthermore, the scope of the present technology may not be confined to the specific embodiments of the processes, devices, means, methods and steps described in the description. It may be easily understood by an ordinary person skilled in the art from the disclosure of the present technology, the present technology may use the processes, devices, means, methods or steps that are existing and will be developed in the future, which executing the functions that essentially are the same as the corresponding embodiments described herein or as which obtaining the essentially the same result. Therefore, the appending claims aim to include such processes, devices, means, methods or steps within their scopes.

What is claimed is:

1. A multimedia content self-adaptive method, comprising:
  obtaining context information; and
  solving a media content adaptation problem according to the obtained context information by including:
    transforming an expression of the media content adaptation problem to an expression of a constraint satisfaction problem, wherein the expression of the constraint satisfaction problem includes proposed constraints and compulsory constraints, wherein the compulsory constraints include one-dimension compulsory constraints and two-dimension and more than two dimension compulsory constraints; and
    solving the expression of the constraint satisfaction problem by including:
      implementing one-dimension constraint filtrating calculation on all adjustable options of media document and the one-dimension compulsory constraints to obtain an optional set of available adjustable options;
      solving the optional set of the adjustable options, the two-dimension and more than two dimension compulsory constraints and proposed constraints to obtain all the adjustable options which satisfy the compulsory constraints and the proposed constraint satisfaction degrees thereof; and
      selecting the adjustable options with a highest proposed constraint satisfaction degree, that is the media content adaptive to the current media playing environment, wherein the step of solving the optional set of the adjustable options and the two-dimension and more than two dimension compulsory constraint and proposed constraint further includes:

1) making i=1 and selecting an instance $d_p(x_i)$ from the optional set $D'_i$ of the adjustable option $x_i$ that has not been assigned a value, after it is determined that $d_p(x_i)$ does not conflict with the compulsory constraints $C_F$, assigning $d_p(x_i)$ to $x_i$;

2) selecting an instance $d_q(x_{i+1})$ from the optional set $D'_{i+1}$ of the adjustable option $x_{i+1}$ that has not been assigned a value, judging whether $\{d_p(x_i),d_q(x_{i+1})\}$ conflicts with the compulsory constraints $C_F$ or not;

3) if there is no conflict, then continuing the above operations on the adjustable options that have not been assigned values and returning to 2), otherwise, executing 4);

4) selecting another instance $d_k(x_{i+1})$ from $D'_{i+1}$, then judging again whether $\{d_p(x_i),d_k(x_{i+1})\}$ conflicts with the compulsory constraints $C_F$, if all the available optional sets of $x_{i+1}$ and $d_p(x_i)$ do not satisfy the compulsory constraints $C_F$, starting to back trace to re-assigned values recursively to $x_i$, $x_{i+1}$, . . . which have been assigned values, and returning to 2); and 5) after all of the adjustable options are assigned values, that is an adaptation decision that satisfies the requirement is obtained, then calculating the satisfaction degree of the proposed constraints $C_A$ for each option of the media document.

2. The multimedia content self-adaptive method according to claim 1, wherein the context information includes at least one of the following: terminal capability, network feature, user feature, natural environment and restriction description.

3. The multimedia content self-adaptive method according to claim 1, wherein the context information is obtained from a context model based on MPEG-21 DIA standard.

* * * * *